US010393283B2

United States Patent
Cunningham

(10) Patent No.: US 10,393,283 B2
(45) Date of Patent: Aug. 27, 2019

(54) REGULATING OVERTRAVEL IN BI-FURCATED PLUGS FOR USE IN VALVE ASSEMBLIES

(71) Applicant: Dresser LLC, Addison, TX (US)

(72) Inventor: Thomas Henry Cunningham, North Easton, MA (US)

(73) Assignee: Dresser, LLC, Addison, TX (US)

( * ) Notice: Subject to any disclaimer, the term of this patent is extended or adjusted under 35 U.S.C. 154(b) by 50 days.

(21) Appl. No.: 15/714,584

(22) Filed: Sep. 25, 2017

(65) Prior Publication Data

US 2019/0093781 A1 Mar. 28, 2019

(51) Int. Cl.
| | | |
|---|---|---|
| F16K 27/02 | (2006.01) | |
| F16K 39/02 | (2006.01) | |
| F16K 3/24 | (2006.01) | |
| F16K 1/12 | (2006.01) | |
| F16K 1/42 | (2006.01) | |

(52) U.S. Cl.
CPC ............. *F16K 27/02* (2013.01); *F16K 1/12* (2013.01); *F16K 1/42* (2013.01); *F16K 3/24* (2013.01); *F16K 39/022* (2013.01); *Y10T 137/1624* (2015.04)

(58) Field of Classification Search
CPC ... F16K 27/02; F16K 1/12; F16K 1/42; F16K 39/022; F16K 39/02; F16K 3/243; F16K 3/246; F16K 27/04; F16K 27/041; F16K 1/02; F16K 3/267; F16K 3/24; F16K 17/383; Y10T 137/1624; Y10T 137/1797; Y10T 137/7737

USPC ............... 251/79, 80, 77, 285, 284, 82, 83; 137/67, 72, 467; 335/217
See application file for complete search history.

(56) References Cited

U.S. PATENT DOCUMENTS

| | | | |
|---|---|---|---|
| 1,779,893 A | 10/1930 | Charles | |
| 2,035,165 A | 3/1936 | Jardine | |
| 2,341,018 A * | 2/1944 | Clapp | ............. F01L 3/00 137/244 |
| 3,073,689 A | 1/1963 | Kuppeit | |
| 3,211,419 A | 10/1965 | Hubert | |
| 3,624,753 A | 11/1971 | Brumm | |
| 3,727,927 A | 4/1973 | Packard | |
| 3,751,784 A | 8/1973 | Packard | |
| 3,926,166 A | 12/1975 | Packard | |
| 3,980,310 A | 9/1976 | Packard et al. | |

(Continued)

FOREIGN PATENT DOCUMENTS

| | | |
|---|---|---|
| BE | 372724 A | 8/1930 |
| EP | 0900962 A | 5/2003 |

(Continued)

*Primary Examiner* — Craig J Price
*Assistant Examiner* — Andrew J Rost
(74) *Attorney, Agent, or Firm* — Paul Frank + Collins P.C.

(57) ABSTRACT

A gap control device that works with a plug on a valve assembly for use in high-temperature applications. The plug may include two parts and a compressible seal that, when compressed, engages with an adjacent wall of a cylinder or "cage" typical of a trim assembly. In one embodiment, the gap control device forms a hard stop that expands in response to high temperatures. This feature prevents excess over-travel between the two parts of the plug in the high-temperature applications so as to limit stress and wear on the compressible seal.

20 Claims, 5 Drawing Sheets

(56) References Cited

U.S. PATENT DOCUMENTS

| | | |
|---|---|---|
| 4,083,529 A | 4/1978 | Santy et al. |
| 4,123,072 A | 10/1978 | Sharpe |
| 4,274,433 A * | 6/1981 | Schnall .................. F16K 3/267 137/454.6 |
| 4,722,507 A | 2/1988 | Lindakers et al. |
| 4,978,102 A | 12/1990 | Schuchart et al. |
| 5,564,674 A | 10/1996 | Kalin et al. |
| 5,899,435 A | 5/1999 | Mitsch et al. |
| 6,634,352 B2 | 10/2003 | Maiello |
| 6,851,658 B2 | 2/2005 | Fitzgerald et al. |
| 7,810,816 B1 | 10/2010 | Haling |
| 7,926,784 B2 | 4/2011 | Fleming |
| 8,152,134 B2 | 4/2012 | Steriberg |
| 8,167,269 B2 | 9/2012 | Bell et al. |
| 8,256,462 B2 | 9/2012 | Lin et al. |
| 8,272,399 B2 | 9/2012 | Farrow et al. |
| 8,408,231 B2 | 4/2013 | Lo et al. |
| 8,671,988 B2 | 3/2014 | Lin et al. |
| 9,022,070 B2 | 5/2015 | Anderson |
| 9,395,019 B2 * | 7/2016 | Cunningham .......... F16K 3/246 |
| 2002/0017327 A1 | 2/2002 | Kawaai et al. |
| 2002/0047100 A1 | 4/2002 | Lorraine |
| 2004/0149950 A1 | 8/2004 | Fitzgerald et al. |
| 2005/0023496 A1 | 2/2005 | Foster |
| 2007/0210270 A1 | 9/2007 | Stephenson et al. |
| 2010/0148447 A1 | 6/2010 | Halling |
| 2010/0243936 A1 | 9/2010 | Nesje |
| 2010/0270491 A1 | 10/2010 | Faas |
| 2012/0292550 A1 | 11/2012 | Meek |
| 2012/0323379 A1 | 12/2012 | Robertson, III |
| 2014/0014865 A1 | 1/2014 | Anderson |
| 2014/0137947 A1 | 5/2014 | Cunningham |
| 2015/0001432 A1 | 1/2015 | Cunningham |

FOREIGN PATENT DOCUMENTS

| | | |
|---|---|---|
| FR | 2658261 A | 8/1991 |
| GB | 247589 A | 6/1926 |
| JP | 36132864 U | 2/1986 |
| JP | 4203205 A | 7/1992 |
| WO | WO 2010091291 | 8/2010 |

* cited by examiner

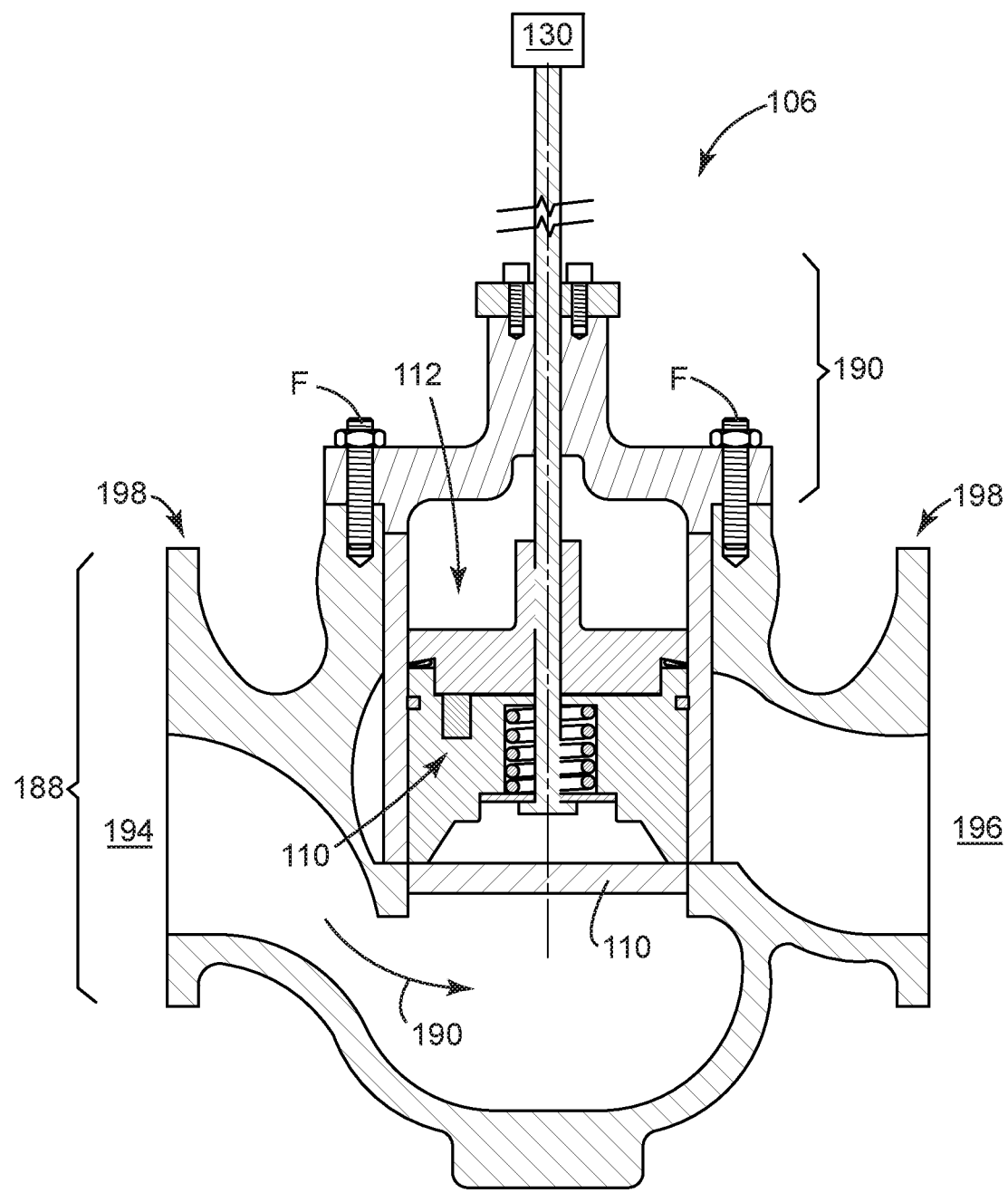

REGULATING OVERTRAVEL IN BI-FURCATED PLUGS FOR USE IN VALVE ASSEMBLIES

BACKGROUND

Flow controls are important in many industries. Valve assemblies are a type of flow control that are ubiquitous on process lines, gas distribution networks, or any system that carries flowing material. These devices regulate material flow within set parameters, or, in case of problems, shut-off flow altogether. To do this, the devices often leverage mechanical mechanisms to regulate flow for this purpose. The mechanisms may include an actuator that couples with a valve, typically having a closure member and a seat. The closure member may embody a plug, a ball, a butterfly valve, or like implement that the actuator moves to positions relative to the seat. These positions define flow of material through the device, including, for example, open positions that allow flow through the device and a closed position, where the closure member contacts the seat to prohibit flow.

SUMMARY

The subject matter disclosed herein relates to improvements to accommodate applications that expose valves (in valve assemblies) to material at extreme temperatures. Of particular interest herein are embodiments that regulate movement of parts found in a bi-furcated plug. This type of plug is often found in valve assemblies that can handle material at very low temperatures (e.g., at or less than −150° F.) or very high temperatures (e.g., at or greater than 600° F.). The plug may have two parts and a resilient seal that separates the parts under load. Relative movement between the parts can compress the resilient seal so that, in most cases, the resilient seal contacts another part of the valve assembly. The embodiments are useful to ensure that movement between the parts is repeatable and predictable. For high temperature applications, this feature can avoid unnecessary wear and limit stresses on the resilient seal that may result from over-travel due to expansion (or like thermal changes) of the parts that occurs in response to the material temperature.

DRAWINGS

Reference is now made briefly to the accompanying drawings, in which:

FIG. 6 depicts an elevation view of the cross-section from the side of the gap control device of FIGS. 2 and 3 as part of an example of a valve assembly.

Figure 1:
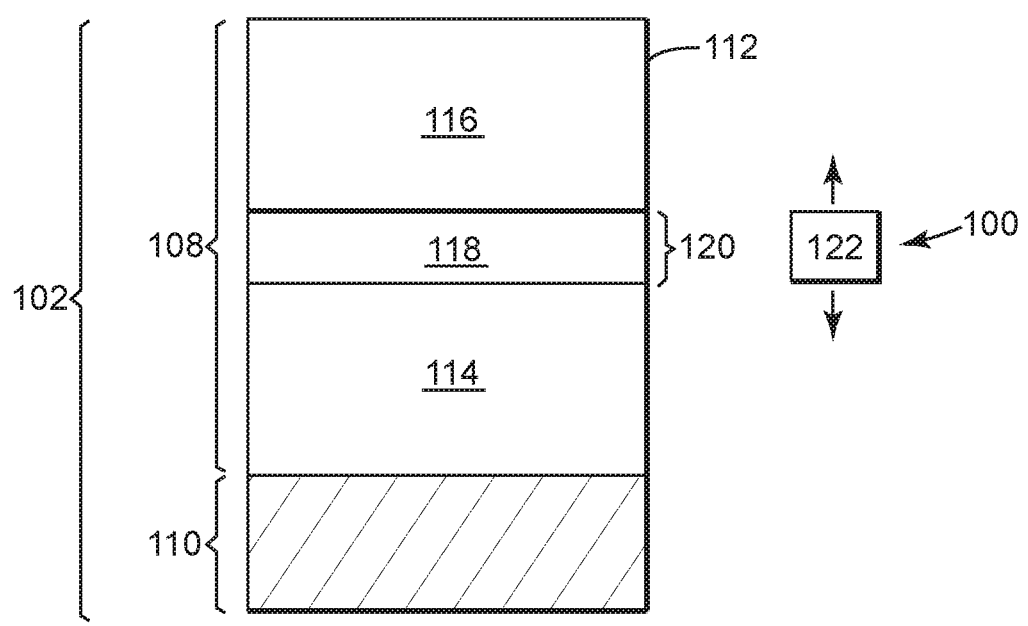
FIG. 1 depicts a schematic diagram of an exemplary embodiment of a gap control device as part of a valve.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion that follows describes embodiments of a gap control device that can operate to regulate over-travel in bi-furcated plugs. However, the concepts may apply to other closure members or, generally, to valves (and valve assemblies) that need to control relative movement or position between two or more components. It is not uncommon, for example, that operating conditions can induce changes (e.g., thermal expansion or contraction) in these components. Efforts to manage these changes through design and manufacture can address some of the potential issues that arise at the device in the field. But some applications may need to meet certain standards or specifications that can test limits of fits, tolerances, and like engineering practices. The embodiments herein may supplement these practices to improve performance or, at least, extend life of parts to avoid costly maintenance and repairs. Other embodiments may be within the scope of this disclosure as well.

FIG. 1 depicts a schematic diagram of an exemplary embodiment of a gap control device 100 that can address some of these potential issues. The gap control device 100 is shown as part of a valve 102 that regulates flow of material 104 in a valve assembly, identified generally by numeral 106. Examples of material 104 may include fluids, solids, and fluid/solid mixes, as well. The valve 102 may have a pair of valve components (e.g., a closure member 108 and a seat 110). The closure member 108 may comprise a plug 112 having a bifurcated structure with two parts (e.g., a first part 114 and a second part 116). The structure may also incorporate a seal 118 that operates to form a gap 120 between the parts 114, 116. The gap control device 100 may form a hard stop 122 that interacts with the parts 114, 116. In operation, the valve assembly 106 applies a load L to the closure member 108 so the plug 112 contacts the seat 110 and arranges the valve 102 in a closed position. The load L may cause the second part 116 to "over-travel" relative to the first part 114. This over-travel reduces the gap 120 enough to deform the seal 118. For high-temperature applications, this feature is useful to meet operative standards for Class V or "effectively zero-leakage" devices.

Broadly, the gap control device 100 can be configured so that the hard stop 122 actively controls relative travel between the parts 114, 116. These configurations may limit stress and wear in the seal 118 that may arise because of changes in the parts 114, 116 or other parts of the valve assembly 102. Thermal expansion due to high-temperature materials (e.g., material 104), for example, may allow the second part 116 to move more without any increase to load L. In turn, the gap 120 assumes a dimension in the closed position that is smaller than its "nominal" dimension that is typical of operation of the valve 102 with material 104 at room temperature. Use of the gap control device 100 maintains the dimension of the gap 120 at or near this nominal dimension independent of temperature of the material 104. This feature avoids unnecessary stress and wear on the seal 118 because the hard stop 122 ensures repeatable, predictable over-travel of the second part 116 relative to the first part 114 at both nominal or "room" temperature and at elevated temperatures that occur in high-temperature applications. As an added benefit, "active" control of the gap 120 could reduce costs of construction because the plug 112 could employ different, less costly materials yet still meet stringent operation requirements for high temperature applications, particularly in high-temperature applications (where the operating temperature may exceed 600° C. or more).

The valve 102 may find use in myriad of applications. These devices can incorporate into systems for use in oil and gas processing, power generation, refining, chemical and petrochemical, and water control. These industries often deal in processes that transmit materials under high-temperature and pressure. Such parameters may limit or constrain designs for the valve 102 and its components.

The two-part plug 112 is useful to meet some of these design challenges. Advantageously, its construction can "actuate" the seal 118 to meet more stringent operating requirements without sacrifice to operating speed or responsiveness. This construction may use materials with properties particularly suited to material 104, or more generally that comport with pressure, temperature, chemical characteristics, cost, and system construction. Exemplary materials include titanium, duplex stainless steels, and Nickel alloys, to name only a few.

The seal 118 may be configured to change shape in response to movement of parts 114, 116. Resilient materials like spring steels may prove useful so that the seal 118 can accommodate different dimensions of the gap 120. When compressed, the resilient device may extend from the periphery of the plug 112, for example, to contact proximate structures, like a cage discussed more below.

Figure 2:
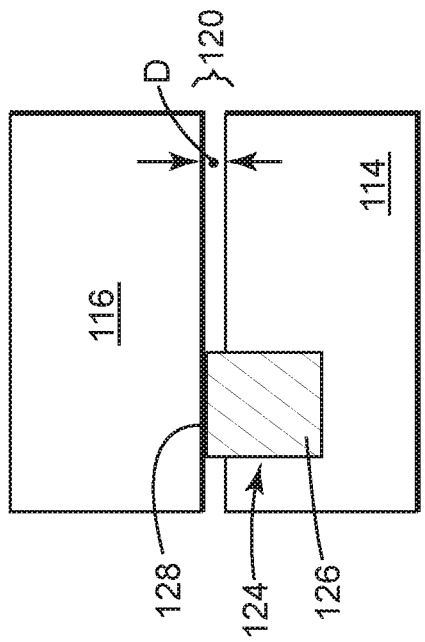
FIG. 2 depicts a schematic diagram of the gap control device of FIG. 1 in a first thermal configuration.

FIG. 2 depicts a schematic diagram of an example of the gap control device 100 of FIG. 1 to inform the discussion of its design. The hard stop 122 may include a thermally-active member 124 with a thermal core 126 that forms a stopping surface 128 proximate the gap 120. The thermal core 126 may embody an elongate cylinder, although other geometries, like cubes or spheres, may suffice as well. The elongate cylinder may be disposed in the first part 114 or the second part 116, as desired. Suitable materials for the thermal core 126 may have homogenous or non-homogenous compositions. Care may be taken to ensure the material has a coefficient of expansion ("COE") that will cause the thermal core 126 to respond to the operating temperature independent of (or at a different rate than) the parts 114, 116. In one implementation, the elongate cylinder may assume a thermal configuration that corresponds with its thermal response to temperature of material 104. At nominal or room temperature, the thermal configuration sets a first position for the stopping surface 128 that does not interfere with over-travel of the first part 114. The stopping surface 128 may reside outside of gap 120; for example, co-planar with the top surface of the first part 114 or, even, below the top surface altogether.

Figure 3:
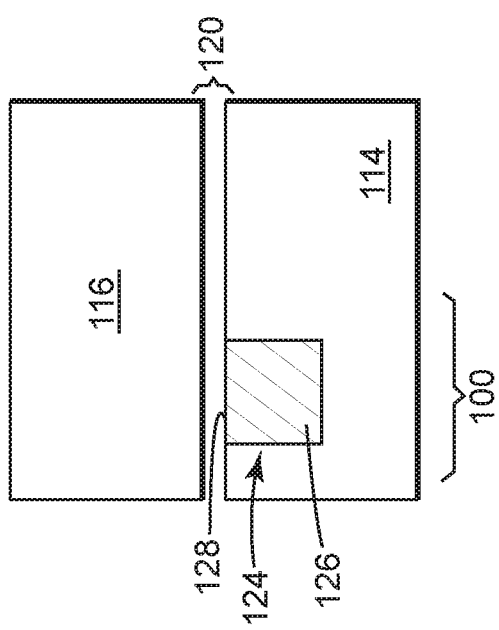
FIG. 3 depicts a schematic diagram of the gap control device of FIG. 1 in a second thermal configuration.

FIG. 3 shows the example of gap control device 100 of FIG. 1 to illustrate another thermal configuration for the elongate cylinder. This thermal configuration may correspond with thermal expansion of the elongate cylinder. As shown, the elongate cylinder may embed into the first part 114 to expose only the top, stopping surface 122. This feature may operate to constrain expansion in all directions but one, identified by the arrow E. The thermal expansion can set a second position for the stopping surface 128 that is different from the first position (e.g., in FIG. 2). Preferably, the stopping surface 128 is "above" the first part 114 or closer to the second part 116, as measured by a dimension D between the stopping surface 126 and the top surface of the first part 114. Values for the dimension D may be calculated based on thermal properties and geometry for the thermal core 126. It may be beneficial that dimension D is set at least to avoid total collapse or total compression of the seal 118.

Figure 4:
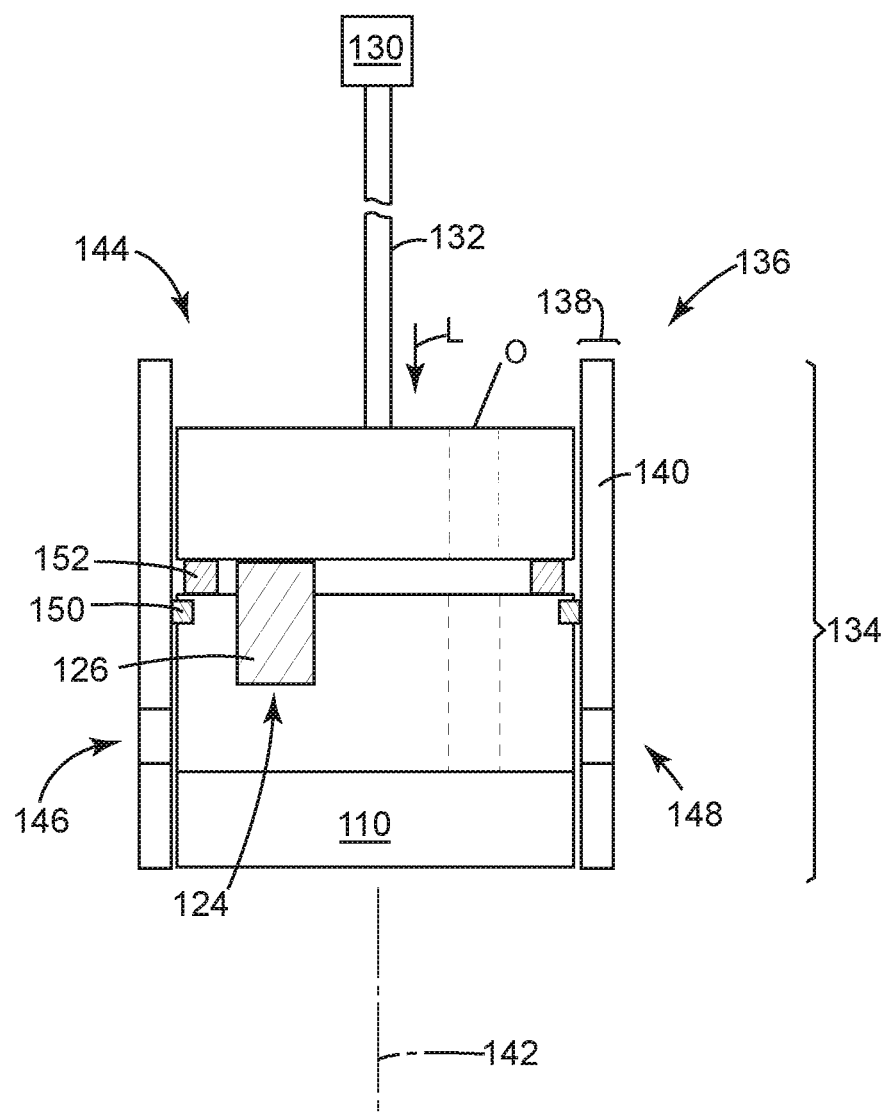
FIG. 4 depicts a schematic diagram of the gap control device of FIGS. 2 and 3 as part of a trim assembly.

FIG. 4 depicts a schematic diagram that shows an example of the gap control device 100 of FIG. 2 with additional details of the valve components. The valve assembly 106 may include an actuator 130 that couples with the plug 112 via a stem 132. The valve assembly 106 may also include a trim assembly 134 having a cylinder 136 (also "cage 136"), with a peripheral wall 140 that circumscribes an axis 142 to form bore 144. The peripheral wall 140 may have one or more openings (e.g., a first opening 146 and a second opening 148). The openings 146, 148 may be perpendicular to the axis 142 and penetrate the peripheral wall 140 to allow access to the interior of the bore 144. In one implementation, the plug 112 may include a piston seal ring 150, shown here as an annular ring, typically graphite or metal, that circumscribes the outer surface of the first part 114. When in use, this annular ring may remain in contact with the bore 144, which helps to reduce pressure drop and velocity as the plug 112 moves away from the seat 114. The piston seal ring 150 can also help damp vibrations in the stem 132. As also shown, the seal 118 may embody a resilient element 152 (like a constant-force spring) that resides between the parts 112, 114 of the plug 112. Examples of the resilient element 152 may include spring washers, like Belleville washers, that deform under substantially uniform loading (e.g., constant load L).

Some implementations of the valve assembly 106 may be configured to "balance" pressure of material 104 across the plug 112. This feature may require openings O in the plug 112. The openings O operate to allow upstream or downstream pressure to act on both sides of the plug 112. The actuator 130 is often smaller in these designs because the higher, upstream pressure that are responsible for "unbalanced" forces do not act on the plug 112.

The trim assembly 134 may be configured for the valve assembly 106 to operate in applications that require any one of the standard leak classifications for control valves. These configurations may, for example, operate to "effectively zero leakage" or IEC 60534-4 Class V standards. This feature maintains maximum leakage through the valve at 0.0005 ml of water per minute, per inch of port diameter per PSI differential pressure, typically measured from valve inlet to valve outlet with leakage contributed by the interface between the plug 112 and seat 114, gaskets between components of the trim assembly 134, and between the "balance" seal and the cage 138 or plug 112. In the over-travel position, the bifurcated plug 112 compresses the spring 152, which urges the resilient element 152 into contact with the bore 144 to provide tight shutoff.

Figure 5:
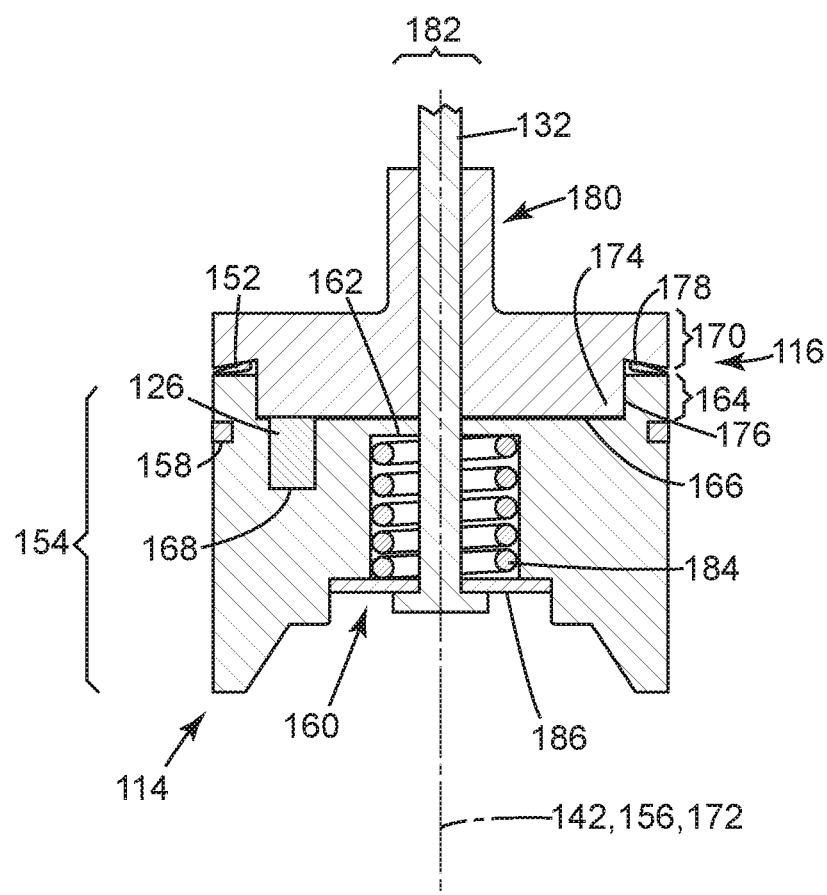
FIG. 5 depicts an elevation view of the cross-section from the side of an example of the trim assembly of FIG. 4.

FIG. 5 depicts an elevation view of the cross-section from the side of an example that shows additional structure for use with the gap control device 100. The first part 114 may have an annular body 154 with a central axis 156. A groove 158 may penetrate the outer surface to receive the piston seal ring 150. On its bottom, the annular body 154 may have a central aperture 160 that aligns with the central axis 156. The central aperture 160 may terminate at a bottom surface 162. On the top, the annular body 154 may have a recess 164 that forms a surface 166. The recess 164 may have an offset bore 168 that is offset from the central axis 156 towards the periphery of the annular body 154. The core 126 may reside in the offset bore 168. As also shown, the second part 116 may form an annular disc 170 with a central axis 172. On one side, the annular disc 168 may have an annular boss 174 that terminates at a peripheral step 176 that forms a step surface 178. The opposite side of the annular disc 170 may include a protruding boss 180. A central bore 182 may penetrate through the body 154 and disc 170 along the axes 156, 172. When assembled, the annular boss 174 fits into the recess 162. The spring 152 resides between the top of the annular body 154 and the step surface 178 of the annular disc 170. The stem 132 may extend through the central bore 182. As shown, the trim assembly 110 may include a coil spring 184 that inserts over an exposed end of the stem 132 to reside in the central aperture 160. A retaining ring 186 (like a washer) may reside on the stem 132 to maintain the coil spring 184 in its position against the bottom surface 162. Complimentary threads on the stem 132 and second part 116 may secure the stem 132 to the plug 112 and, thus, secure the part in position with appropriate pre-load or compression of the coils spring 184.

FIG. 6 depicts an elevation view of the cross-section from the side of an example that shows additional structure for use with the gap control device 100. Structure for the valve assembly 106 may include a valve body 188 that couples with a bonnet 190 via one or more fasteners F. The valve body 188 may also have a flowpath 192 that terminates at open ends (e.g., a first open end 194 and a second open end 196). Flanges 198 or butt-weld ends at the open ends 194, 196 may be configured to couple with sections of pipes or pipelines. In use, this structure may enjoy use across a wide spectrum of applications. Also known as a "control valve," the device may integrate into process control systems (or "distributed control system" or "DCS") with a control loop. These systems may manage operation of many different flow controls, including the valve assembly 106. The control loop, for example, may generate signals (or "control signals") that cause the valve assembly 106 to activate the actuator 130 to position the plug 112 relative to the seat 110.

In light of the foregoing discussion, embodiments of the gap control device 100 proposed herein can maintain repeatable, reliable movement of the parts in bifurcated plugs. These improvements can extend lifetime of resilient seals that separate the parts and outfit these plugs for use in high-temperature applications.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A method, comprising:
    operating a valve assembly to regulate flow of material by,
        moving a first part of a two-part plug to a closed position against a seat;
        overdriving a second part relative to the first part in the closed position to compress a seal ring; and
        stopping compression of the seal ring with a hardstop having a stopping surface that prevents travel of the second part, wherein the stopping surface varies in position in response to temperature of the hardstop.

2. The method of claim 1, wherein the stopping surface is set in from peripheral edges of the first part and the second part.

3. The method of claim 1, wherein the hardstop comprises material that expands at a rate that is different from either the first part or the second part of the two-part plug.

4. The method of claim 1, wherein the stopping surface resides in between the first part and the second part.

5. The method of claim 1, wherein the hardstop is disposed in the first part.

6. A valve assembly, comprising:
    an actuator;
    a valve coupled with the actuator, the valve comprising a closure member and a seat, the closure member comprising two pieces that are moveable relative to one another under load from the actuator; and
    a gap control device disposed in proximity to the two pieces of the closure member, the gap control device comprising a hard stop that prevents relative movement between the two pieces,
    wherein the hard stop comprises material that expands under temperature at a rate that is different from material of at least one of the two pieces of the closure member.

7. The valve assembly of claim 6, wherein the hard stop resides between the two pieces of the closure member.

8. The valve assembly of claim 6, wherein the hard stop is disposed in one of the two pieces of the closure member.

9. The valve assembly of claim 6, wherein the hard stop forms a core that extends into one of the two pieces of the closure member.

10. The valve assembly of claim 6, further comprising:
    a compressible seal disposed between the two pieces of the closure member.

11. The valve assembly of claim 6, further comprising:
    an annular ring comprising resilient material disposed between the two pieces of the closure member.

12. The valve assembly of claim 6, further comprising:
    a cylinder having a peripheral wall circumscribing the two pieces of the closure member.

13. The valve assembly of claim 6, wherein the hard stop is cylindrical.

14. The valve assembly of claim 6, wherein the hard stop has a material composition that is homogenous.

15. A valve assembly, comprising:
    a valve body forming a flow path for material;
    a trim assembly disposed in the valve body, the trim assembly having a cylinder and a plug disposed inside of the cylinder, the plug having a first part, a second part, and a resilient seal member disposed therebetween so as to form a gap between the first part and the second part, the plug further comprising a gap control device that prevents relative movement between the first part and the second part,
    wherein the gap control device comprises material that expands at a rate that is different from either the first part or the second part.

16. The valve assembly of claim 15, further comprising:
a valve stem extending through the first part and the second part; and
a coil spring disposed on an end of the valve stem.

17. The valve assembly of claim 15, wherein the gap control device is cylindrical.

18. The valve assembly of claim 15, wherein an aperture penetrates through the first part and the second part.

19. The valve assembly of claim 15, wherein the gap control device has a material composition that is homogenous.

20. The valve assembly of claim 15, wherein the seal comprises spring steel.

\* \* \* \* \*